G. A. WOODROM.
COTTON CHOPPER.
APPLICATION FILED JUNE 25, 1912.

1,071,493.

Patented Aug. 26, 1913.

4 SHEETS—SHEET 4.

WITNESSES

INVENTOR
G. A. Woodrom
By his Attorney.

UNITED STATES PATENT OFFICE.

GEORGE A. WOODROM, OF LOVING, TEXAS, ASSIGNOR OF ONE-THIRD TO DAVID F. FORD AND ONE-THIRD TO WILLIAM H. BAKER, OF LOVING, TEXAS.

COTTON-CHOPPER.

1,071,493.      Specification of Letters Patent.      Patented Aug. 26, 1913.

Application filed June 25, 1912. Serial No. 705,839.

*To all whom it may concern:*

Be it known that I, GEORGE A. WOODROM, a citizen of the United States, residing at Loving, in the county of Young and State of Texas, have invented certain new and useful Improvements in Cotton-Choppers, of which the following is a specification, reference being had therein to the accompanying drawing.

This invention relates to agricultural implements and has special reference to a cotton chopper for implements of this character.

One object of the invention is to improve the general construction of choppers of this character.

A second object of the invention is to provide an improved means for controlling the position of the chopper blades.

With the above and other objects in view, this invention consists in general of certain novel constructions, combinations and arrangements of parts, as will be hereinafter fully described, illustrated in the accompanying drawings, and specifically claimed.

Figure 1:
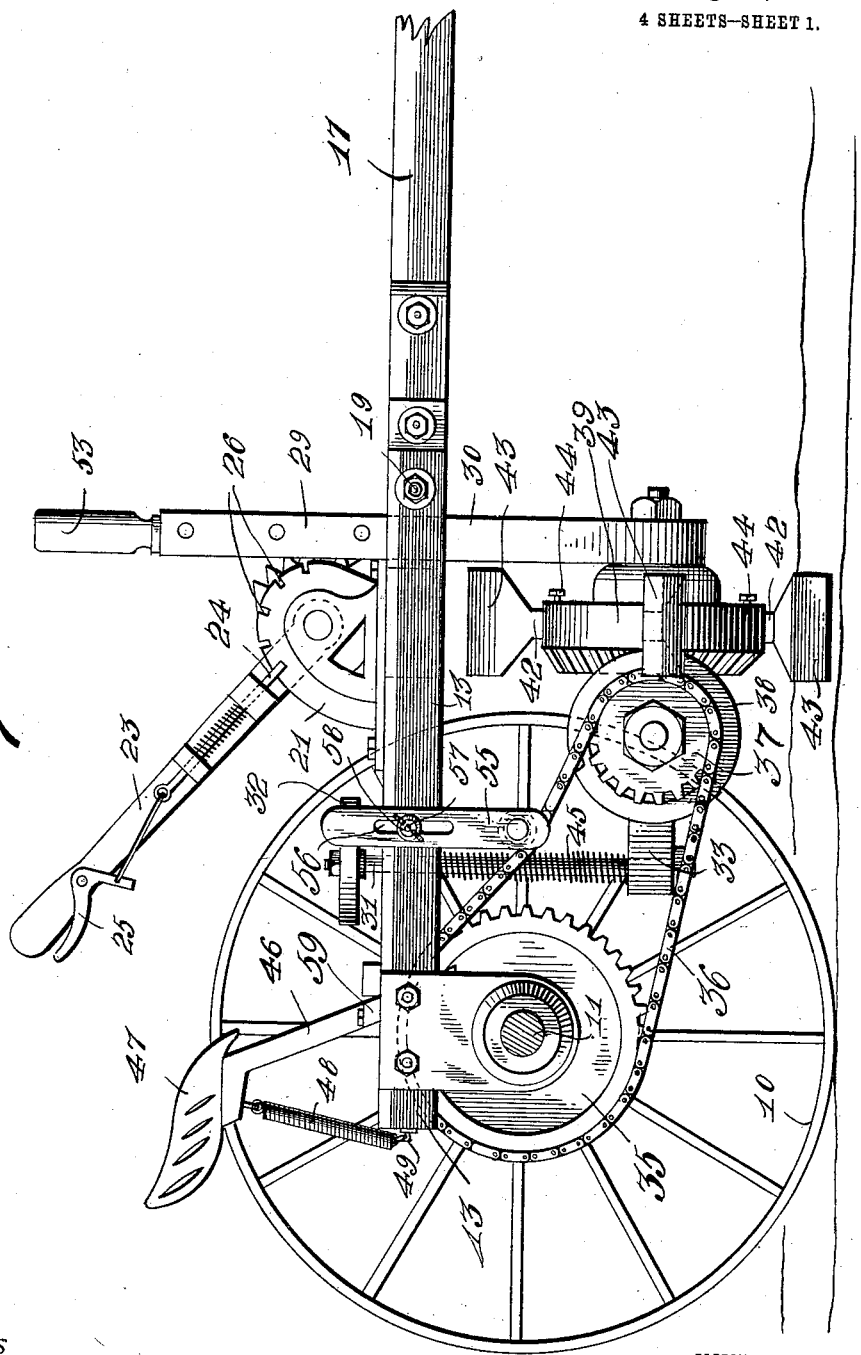
Figure 2:
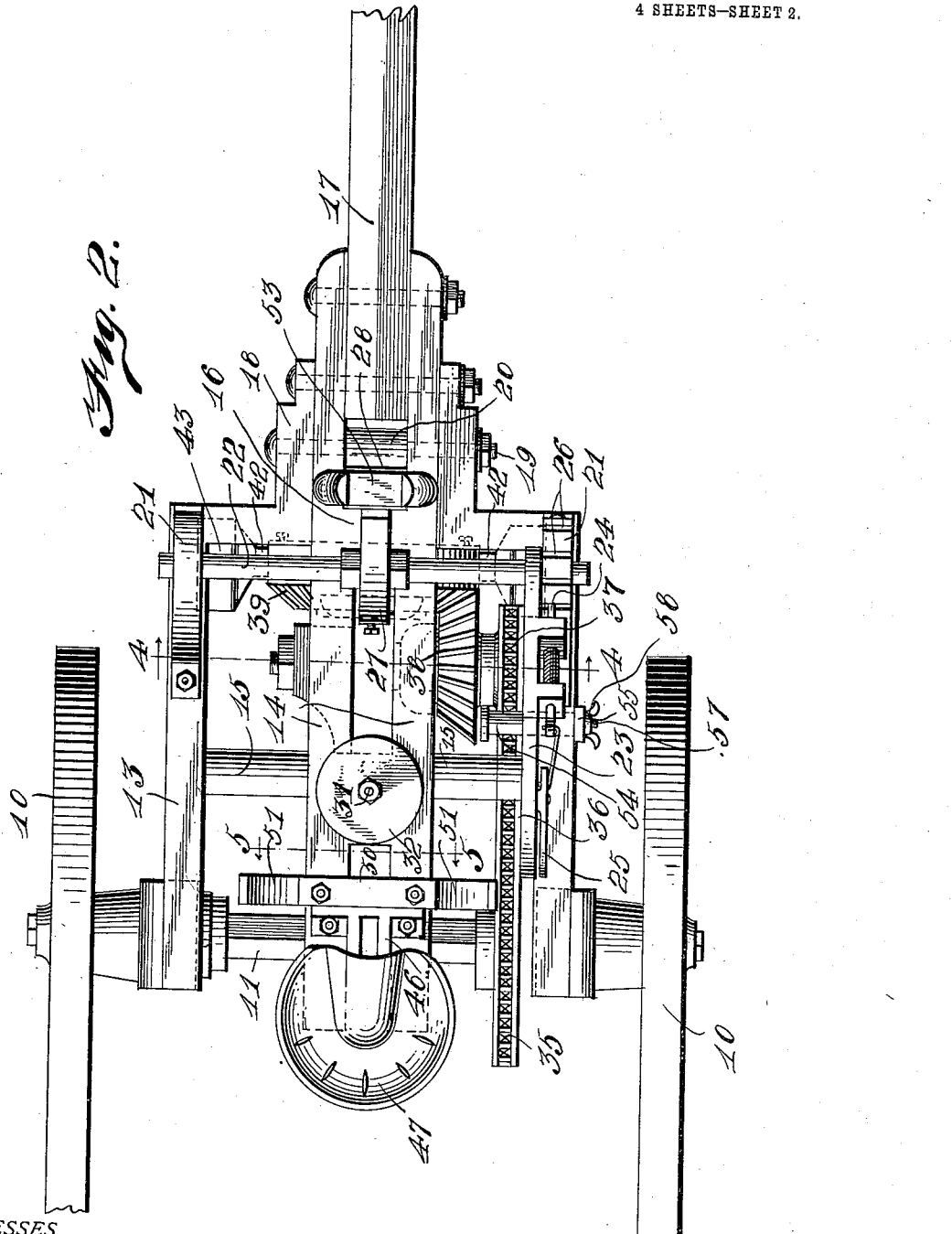
Figure 3:
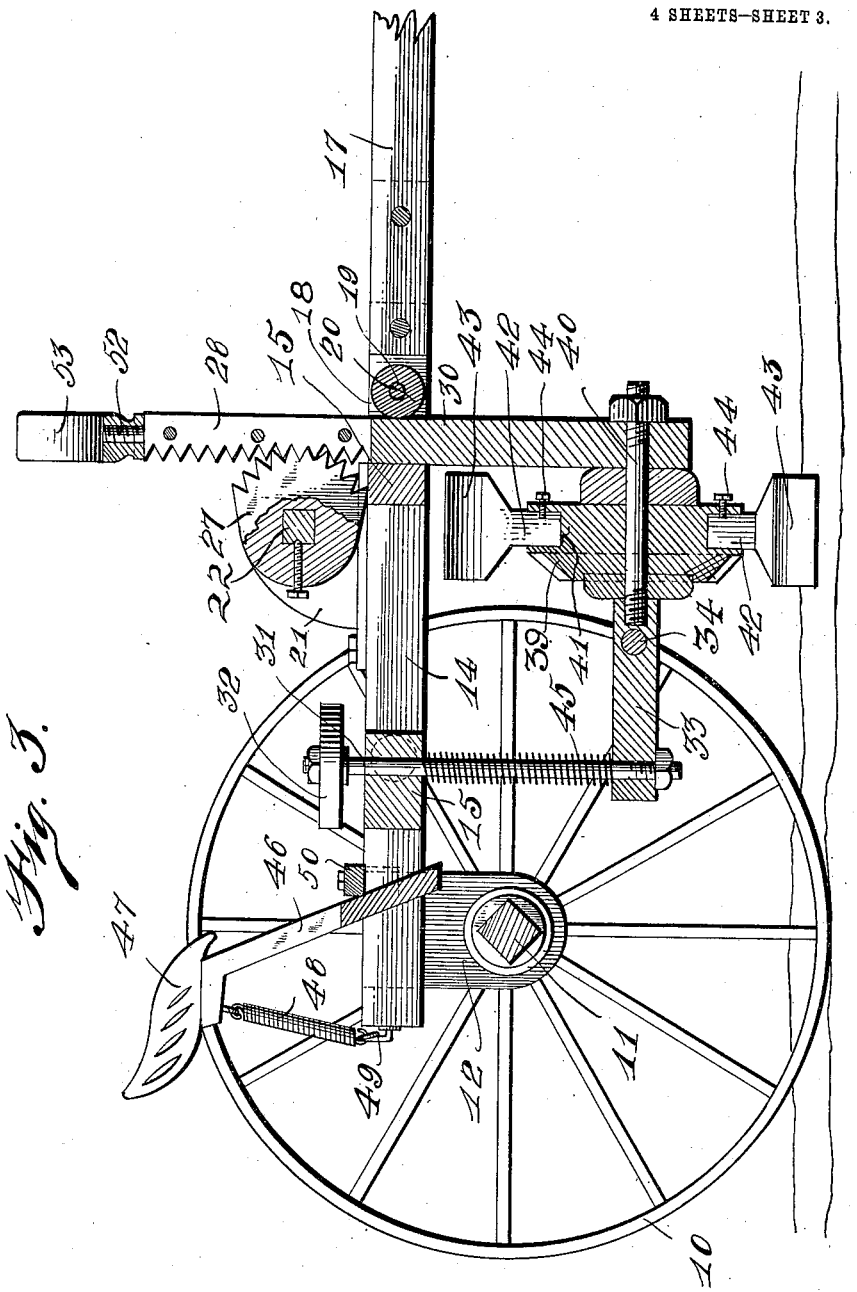
Figure 4:
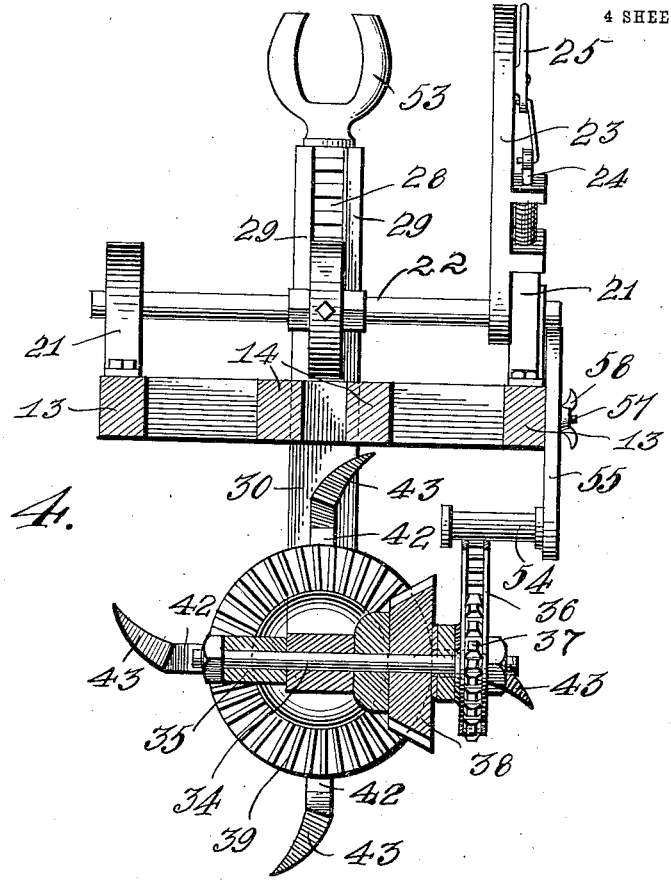
Figure 5:
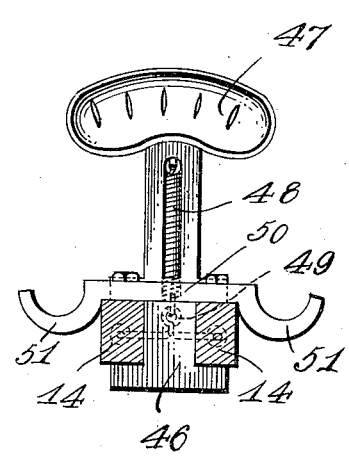

In the accompanying drawings, like characters of reference indicate like parts in the several views, and Figure 1 is a side elevation of a chopper constructed in accordance with this invention. Fig. 2 is a plan view thereof. Fig. 3 is a longitudinal median section therethrough. Fig. 4 is a detail section on the line 4—4, Fig. 2, certain of the parts being omitted. Fig. 5 is a detail section on the line 5—5, Fig. 2, certain of the parts being omitted.

In carrying out this invention, I provide a pair of ground wheels 10 which are mounted on an axle 11, one of the wheels being fixed to said axle and the other revolving loosely thereon. This axle is supported in bearings 12 depending from the side members 13 of the chopper frame. These side members are secured to center members 14 by transverse frame members 15. The center members are spaced apart by spacers 16 arranged at spaced intervals. Between the forward ends of the center members is provided a tongue 17 for the attachment of draft animals. The forward transverse members are provided with extensions 18 and through these extensions and the center members passes a bolt 19. On the bolt 19 there is a roller 20 which is positioned between the center members and is in spaced relation to the forward transverse member. Extending upward from the side members 13 are bearings 21 wherein is received a shaft 22. On this shaft 22 is fixed a lever 23 provided with the usual latch 24 and handle for operating the latch 25. This lever 23 is positioned adjacent the right hand bearing 21 and the upper part of the periphery of this bearing is provided with a series of notches 26 to receive the latch 24. Centrally disposed on the shaft 22 is a segmental gearing 27 the teeth whereof mesh with rack teeth formed on a bar 28 held between the arms 29 of a standard 30. Through the rear spacer there passes a rod 31 carrying on its upper end a stop disk 32 and upon the lower end of this rod 31 there is rigidly secured a forwardly extending support 33. Through this support 33 extends a bolt 34 forming a stub shaft, the bolt extending also through a bearing block carried on one side of the rod as indicated at 35, the block being for the purpose of adding extra bearing to the stub shaft 34.

On the axle 11 is fixed a sprocket 35 over which extends a chain 36. On the stub shaft 34 is a similar sprocket 37 around which said chain 36 also extends so that as the machine moves along the field the stub shaft 34 will rotate, the sprocket 37 being fixed thereon. Upon the stub shaft 34 is also fixed a beveled gear 38 which meshes with a beveled gear 39 mounted on a shaft 40 which has one end fixed in the forward end of the support 33 and has its other end passing through a suitable opening made in the lower end of the standard 30. Around its periphery this beveled gear is provided with suitable openings 41 wherein are received the shanks 42 of chopper blades 43, the latter being held in place by suitable set screws 44. Surrounding the rod 31 is a coil spring 45 which constantly urges the rear end of the member 33 downward. There is also provided the usual seat standard 46 whereon is mounted a seat 47. To the upper end of the standard is secured one end of a coil spring 48 which has its other end secured to a loop 49 carried by the frame. The seat is so arranged as to have a slight movement and may be adjusted in position by sliding the same between the center members. Fixed upon the center members is a foot rest 50 having curved ends 51 for the operator's feet. On the upper end of the rack bar 28 is a pin 52 whereon is mounted a fork 53 for the reception of the reins.

For the purpose of gripping the sprocket chain 36 tight when the parts are adjusted there is provided an idler 54 which is carried on arm 55 supported on pin 57 which passes through slot 56 and on this pin 57 there is mounted a butterfly nut 58 for the purpose of holding the idler 54 in adjusted position.

It is to be noted that the seat standard is provided with laterally projecting portions 59 which engage the upper and lower sides respectively of the center members and that the action of the springs 48 locks these lugs against said sides and prevents sliding of the standard.

In the operation of the device the driver accomplishes the adjustment of the forward end by moving the lever 23. At the same time the spring moves the rear end of the support 33 down in unison with the movement of the standard. When the machine is driven through the field motion will be transmitted from the axle through the sprockets and chain to the shaft and from there through the gearing to the chopper blades.

There has thus been provided a simple and efficient device of the kind described, and for the purpose specified.

It is obvious that many minor changes may be made in the form and construction of this invention without departing from the material principles thereof, and it is therefore not wished to confine the invention to the exact form herein shown and described, but it is wished to include all such as properly come within the scope claimed.

Having thus described the invention, what is claimed as new, is:—

1. A cotton chopper comprising a supporting frame, a rod movably connected with said frame, a spring surrounding said rod, a standard movably connected with said frame, a support connecting the lower ends of said rod and standard, a hub rotatably mounted upon said support, chopper blades carried by said hub, a gear plate carried by said hub, a gear wheel carried by said support and meshing with the teeth of said plate, means for rotating said gear wheel, and means for raising and lowering said standard.

2. A machine of the character described comprising a supporting frame, a rod carried by said supporting frame, a support at the lower end of said rod, a spring engaging said support to normally hold said rod in a lowered position, a standard slidable vertically through said frame, gear teeth formed upon said standard, a shaft carried by said frame, a toothed disk carried by said shaft and engaging the teeth of said standard, said standard having its lower end connected with said support, whereby rotation of said disk will vertically adjust said standard and said support, a hub carrying a gear plate rotatably mounted upon said support, chopper blades carried by said hub, a gear wheel carried by said support and meshing with the gear plate of said hub, and means for rotating said gear wheel.

3. In a machine of the character described, a supporting frame comprising inner and outer longitudinally extending bars, brackets carried by said inner bars and supporting the forward end portions of said outer bars, a transversely extending bar connecting said longitudinally extending bars, a driving axle rotatably connected with said outer bars, a rod carried by said transversely extending bar, a support at the lower end of said rod, a spring surrounding said rod and positioned between said support and transversely extending bar, a standard passing between said inner bars and having its lower end connected with said support, a transversely extending shaft carried by said frame, a disk carried by said shaft and engaging said standard for vertically adjusting the position of said standard, a hub rotatably mounted upon said support, chopper blades carried by said hub, a gear wheel carried by said support and engaging said hub for rotating the same, a wheel mounted upon said axle, and means connecting said wheel with said gear for rotating said gear wheel.

In testimony whereof I hereunto affix my signature in presence of two witnesses.

GEORGE A. WOODROM.

Witnesses:
W. H. SIMMONS,
FRANK BEARD.

---

Copies of this patent may be obtained for five cents each, by addressing the "Commissioner of Patents, Washington, D. C."